United States Patent
Dittmer et al.

(10) Patent No.: US 6,854,578 B2
(45) Date of Patent: Feb. 15, 2005

(54) CLUTCH RELEASE BEARING WITH IMPROVED SEALING ARRANGEMENT

(75) Inventors: Steffen Dittmer, Herzogenaurach (DE); Bernhard Klöpfer, Bad Windsheim (DE); Ludwig Winkelmann, Erlangen (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/449,689

(22) Filed: May 30, 2003

(65) Prior Publication Data

US 2004/0026207 A1 Feb. 12, 2004

Related U.S. Application Data

(63) Continuation of application No. PCT/EP01/13097, filed on Nov. 13, 2001.

(30) Foreign Application Priority Data

Nov. 30, 2000 (DE) .......................................... 100 59 862
Oct. 24, 2001 (DE) .......................................... 101 52 483

(51) Int. Cl.$^7$ .............................................. F16D 23/14
(52) U.S. Cl. .................................... 192/98; 192/110 B
(58) Field of Search ............................. 192/98, 110 B; 384/612, 617

(56) References Cited

U.S. PATENT DOCUMENTS

| | | | |
|---|---|---|---|
| 4,815,867 A | 3/1989 | Ladin | |
| 4,838,402 A | 6/1989 | Feser | |
| 5,547,058 A | 8/1996 | Parzefall et al. | |
| 5,620,076 A | 4/1997 | Voit et al. | |
| 6,126,324 A | * 10/2000 | Ponson et al. | .............. 384/612 |
| 6,189,670 B1 | * 2/2001 | Ponson et al. | .......... 192/85 CA |
| 6,464,060 B1 | * 10/2002 | Ponson et al. | ................ 192/98 |

FOREIGN PATENT DOCUMENTS

| | | |
|---|---|---|
| DE | 195 03 217 A1 | 8/1996 |
| FR | 2 709 526 | 3/1995 |

* cited by examiner

Primary Examiner—Saul Rodriguez
(74) Attorney, Agent, or Firm—Henry M. Feiereisen

(57) ABSTRACT

A clutch release bearing includes a housing, a first bearing ring having a skirt for fixed rotative securement of the first bearing ring to the housing, a revolving second bearing ring connected to the separating clutch via a spring element, and a plurality of rolling elements guided between the first and second bearing rings. Seals are provided on both sides of the rolling elements at a distance thereto and involve a sealing arrangement which is securely fixed to the housing and comprised of at least two components to establish two sealing zones for sealing an annular gap between the first and second bearing rings. The sealing arrangement cooperates with a planar surface of the revolving bearing ring and assumes a desired position, when the revolving bearing ring is installed with the assistance of a press-fit tool.

30 Claims, 5 Drawing Sheets

CLUTCH RELEASE BEARING WITH IMPROVED SEALING ARRANGEMENT

CROSS-REFERENCES TO RELATED APPLICATIONS

This application is a continuation of prior filed copending PCT International application no. PCT/EP01/13097, filed Nov. 13, 2001, on which priority is claimed under 35 U.S.C. §120, the disclosure of which is hereby incorporated by reference.

This application claims the priority of German Patent Applications, Serial Nos. 100 59 862.5, filed Nov. 30, 2000, and 101 52 483.8, filed Oct. 24, 2001, pursuant to 35 U.S.C. 119(a)–(d), the disclosure of which is incorporated herein by reference.

BACKGROUND OF THE INVENTION

The present invention relates, in general, to a clutch release bearing for use in a clutch operator, and more particular to a sealing arrangement for use in a clutch release bearing.

Various approaches are known to seal a clutch release bearing in order to prevent ingress of dirt and moisture into the rolling-contact bearing and escape of lubricant out of the clutch release bearing. German Pat. Publication DE 195 03 217 A1 describes a clutch release bearing for release of a separating clutch, including a torsionally rigid outer bearing ring, which is secured to a housing or axially shiftable guide sleeve of the clutch release bearing, a revolving inner bearing ring, which is connected via a spring element to the separating clutch, and rolling elements, which are received in a cage and guided between the bearing rings. Two seals are provided in sliding contact with the revolving bearing ring. A first seal is mounted to the rigidly fixed outer bearing ring and includes two spread-apart sealing lips which are supported by a cylindrical portion of the revolving inner bearing ring. A second seal is secured to the housing or guide sleeve and has a sealing lip resting against the revolving inner bearing ring. The sealing lips of the seals, which are all in sliding contact with the inner bearing ring, increase friction and thus expose the clutch release bearing to more heat. As a result, lubricant is subject to greater stress and there is a risk of premature failure of the clutch release bearing so that the service life is shortened. Seals for a clutch release bearing of this type are therefore unsuitable for many applications. In particular, there is a danger that the engagement disk of the separating clutch causes swirling rubbed-off parts in the clutch housing, which accommodates the clutch release bearing, to migrate via the sealing lip into the clutch release bearing.

It would therefore be desirable and advantageous to provide an improved clutch release bearing which obviates prior art shortcomings and which realizes an enhanced sealing action, while still being simple in construction.

SUMMARY OF THE INVENTION

According to one aspect of the present invention, a clutch release bearing includes a housing, a first bearing ring having a skirt for fixed rotative securement of the first bearing ring to the housing, a revolving second bearing ring connected to the separating clutch via a spring element, a plurality of rolling elements guided between the first and second bearing rings, sealing means provided on both sides of the rolling elements at a distance thereto, wherein the sealing means includes a sealing arrangement securely fixed to the housing and comprised of at least two components to establish two sealing zones for sealing an annular gap between the first and second bearing rings, wherein the sealing arrangement cooperates with a planar surface of the revolving bearing ring and is placed in a desired position, when the revolving bearing ring is installed with the assistance of a press-fit tool.

The present invention resolves prior art problems by providing a sealing arrangement which is made of at least two components to thereby realize a two-stage seal with two sealing zones, whereby one stage interacts with the revolving bearing ring at a clearance and the other stage involves a sliding contact with the revolving bearing ring. Both sealing zones interact with a radial portion in the form of a planar surface of the revolving bearing ring. A clutch release bearing according to the present invention incorporating a sealing arrangement in this manner ensures an effective sealing action, even when a motor vehicle is operated under extreme situations, for example an all-terrain vehicle during off-road use. Even when traveling through water or when exposed to dust, the sealing arrangement remains effective to prevent ingress of foreign particles of any type into the clutch release bearing. Suitably, the sealing zones are constructed to avoid a disadvantageous temperature increase during the break-in phase as well as during normal operation. Through proper material selection, wear of the sealing arrangement and thus of the clutch release bearing can be minimized to ensure an extended service life.

As the clutch release bearing is assembled, the sealing arrangement according to the present invention is able to automatically assume a proper disposition, when the revolving bearing ring is installed by means of the press-fit tool. Regardless of manufacturing tolerances of individual components of the clutch release bearing that directly interact with the sealing arrangement, an optimal disposition of the sealing arrangement will be achieved during installation. In this way, the sealing arrangement is not loaded in axial direction, which would result in wear and increased heat development, while at the same time the sealing gap in one of the sealing zones is prevented from being too great in size which would adversely affect the sealing quality.

According to another feature of the present invention, the sealing gap between the sealing arrangement and the planar surface of the revolving bearing ring is self-adjusting, when the clutch release bearing is assembled. In this way, an intended slight enlargement of the sealing gap between the planar surface of the revolving inner bearing ring and the sealing arrangement is effected after the break-in phase. The adjusting smallest possible sealing gap of the respective sealing zone of the sealing arrangement is realized in accordance with the present invention substantially without axial load. The other sealing zone involves the use of a sealing lip which can rest against the planar surface of the revolving bearing ring at slight axial force. As a consequence of the two-stage sealing arrangement, the other sealing zone can thus be implemented at slight axial force so that friction is minimized while still realizing a high sealing action of the sealing lip. The two-stage sealing action is so constructed that the first sealing stage of the clutch release bearing protects against ingress of greater particles, while the following sealing stage provides an effective sealing action against ingress of dust and liquids as well as prevents an escape of lubricant.

According to another feature of the present invention, the sealing arrangement may include a ring element mounted in form-fitting engagement or force-fitting engagement to the housing (or guide sleeve) of the clutch release bearing and placed in surrounding relationship to an end of the housing, and a sealing element connected to the ring element and sealingly bearing upon the planar surface of the revolving bearing ring, wherein the sealing element is constructed to define the sealing zones. The sealing element may hereby have a radially inwardly disposed first sealing lip and a radially outwardly disposed second sealing lip, wherein the first sealing lip extends towards the planar surface while maintaining a sealing gap therebetween, and the second sealing lip rests against the planar surface. Hereby, the sealing gap between the inner sealing lip and the revolving inner bearing ring can be extended by simply prolonging the sealing lip to surround an inner contour of the inner bearing ring at a distance thereto.

According to another feature of the present invention, the sealing arrangement may include a ring element mounted in form-fitting engagement or force-fitting engagement to the housing (or guide sleeve) of the clutch release bearing and placed in surrounding relationship to an end of the housing, and a sealing element connected to the ring element and sealingly bearing upon the planar surface of the revolving bearing ring, wherein both, the sealing element and the ring element, are configured to define the sealing zones. The ring element may be a support ring which extends toward the planar surface to axially bound a sealing gap therebetween, wherein the sealing element is disposed in surrounding relationship to an end of the support ring and has a sealing lip resting against the planar surface.

According to another feature of the present invention, the sealing arrangement may include a ring element, constructed to provide the sealing zones spaced in radial direction to effect the two-stage sealing action, a reinforcement extending at an axial offset to the planar surface of the revolving bearing ring and having an end surface interacting with the planar surface, and a tension band for securely mounting the ring element to the housing. The ring element may hereby be made of felt material or fleece material.

According to another feature of the present invention, the sealing arrangement may include a support ring secured to the housing and extending toward the planar surface of the revolving bearing ring to demarcate a sealing gap therebetween for defining one of the sealing zones, a sealing element disposed between an end surface of the support ring and the planar surface for defining the other sealing zone, and a sealing ring received in an annular gap between the support ring and an outer surface area of the housing. The sealing ring may hereby be a felt ring or a lip seal.

According to another feature of the present invention, the sealing arrangement may include a sealing sleeve which defines with the housing an annular gap, and a sealing ring received in the annular gap between the sealing sleeve and the housing, wherein the sealing sleeve has end surface which demarcates the sealing gap for formation of one of the sealing zones and has a splined contour in radially spaced relationship to the sealing gap for defining the other sealing zone, wherein the splined contour includes at least two contact surfaces for interaction with the planar surface. The sealing sleeve provides a high sealing effect, without causing the clutch release bearing to heat up in an undesired manner. Suitably, the sealing zones may be configured as a labyrinth to further enhance the sealing action.

According to another feature of the present invention, the sealing arrangement may include a retention sheet, which is secured to the housing and has one end terminating in a collar turned radially inwards in axial relationship to the planar surface. Disposition and configuration of the collar impacts on the sealing gap formed between the retention sheet and the revolving bearing ring. Another end of the retention sheet is outwardly recessed to form an annular groove which is open radially inwardly ad receives a first sealing ring for sealing an annular gap between the retention sheet and the housing. A second sealing ring is disposed in surrounding relationship to the retention sheet and includes a sealing lip resting, preferably in sliding contact, upon the planar surface of the revolving bearing ring. The outer contour of the outwardly recessed area thus provides also an axial stop for the second sealing ring.

According to another feature of the present invention, the sealing arrangement may include a retention sheet which is snapped onto the housing. The retention sheet has a cylindrical portion in sealing surrounding relationship to the housing, and a vertical radial portion in axial offset relationship to the planar surface for defining the sealing gap and thereby one of the sealing zones. The radial portion is recessed to form an annular groove which is open to the planar surface and receives a sealing ring, suitably an O-ring seal, for defining the other sealing zone.

According to another feature of the present invention, the sealing arrangement may include a support ring directly mounted to the housing and axially bounding with the revolving bearing ring the sealing gap in an area of the planar surface. A sealing element is received in a pocket of the support ring and is disposed in radial surrounding relationship to the sealing gap for sliding contact with the planar surface.

Although the sealing arrangement may be made of various materials, plastic is a preferred material for making the sealing arrangement because the production is cost-efficient and simple and results also in a weight advantage. Moreover, a same thermal expansion coefficient is realized between components made of same plastic, such as housing and support element. Examples of plastic include PA66GF or any other plastic of a strength and temperature stability to withstand the use in a clutch release bearing. Manufacture of the retention sheet is suitably realized by a non-cutting process and made of a material that can be shaped by a deep-drawing process.

According to another feature of the present invention, the sealing arrangement may include a sealing element constructed in the form of a felt ring or fleece ring for interaction with the planar surface of the revolving bearing ring and defining one of the sealing zones. In this way, the sealing gap between sealing element and the revolving bearing ring can be minimized after the break-in phase. This material ensures minimum friction while yet attaining a good sealing action, and thus is especially suitable as seal for the clutch release bearing. Fleece has a high temperature stability and is useable for temperatures of $\geq 140°$ C.

Securement of the sealing arrangement to the housing may be realized in many ways. Examples includes a force-fitting connection, for example through gluing. As an alternative, tension means may be used to wrap the support element, or a form-fitting connection may be provided in the form of, e.g., microscopic splines.

According to another feature of the present invention, the planar surface of the revolving bearing ring may be coated with adhesive grease in the area of the sealing zones or in the support areas of the sealing lip to thereby enhance the sealing action and to reduce friction, and thus to extend the service life. Examples include high-temperature resistant adhesive grease.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
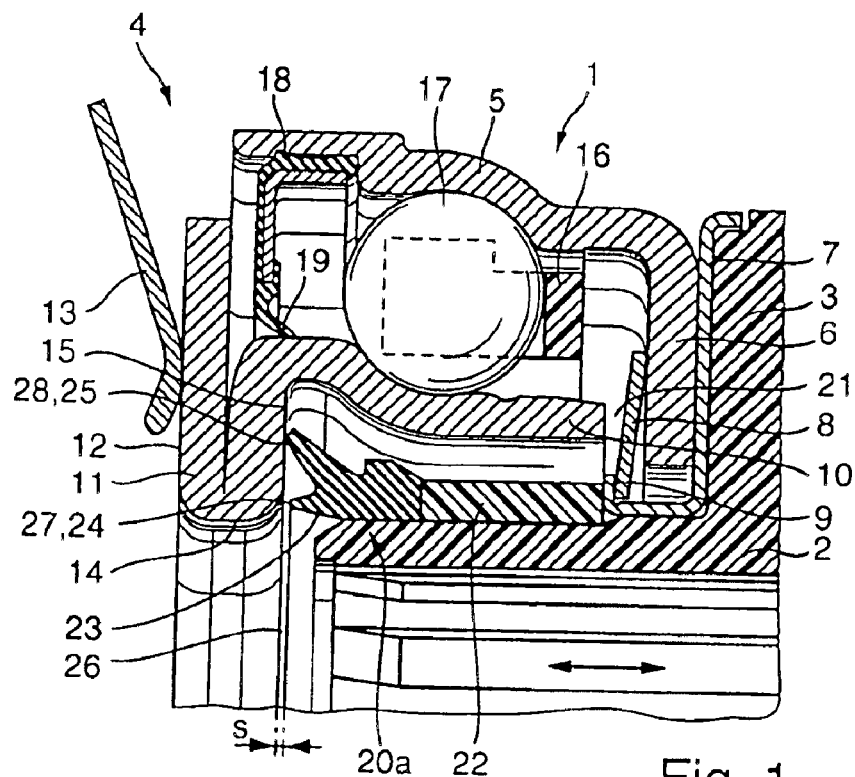
FIG. 1 is a half-section of a clutch operator having incorporated therein a first embodiment of a clutch release bearing according to the present invention.

Throughout all the Figures, same or corresponding elements are generally indicated by same reference numerals. These depicted embodiments are to be understood as illustrative of the invention and not as limiting in any way.

This is one of two applications both filed on the same day. Both applications deal with related inventions. They are commonly owned and have the same inventive entity and same title. Both applications are unique, and expressly incorporate the other by reference.

Turning now to the drawing, and in particular to FIG. 1, there is shown a half-section of a first embodiment of a clutch operator, generally designated by reference numeral 1 and disposed between an internal combustion engine and a gearbox for operating a separating clutch. The clutch operator 1 includes a housing 2 which is movable in an axial direction, indicated by the double arrow, and is arranged in coaxial surrounding relationship to the drive shaft (not shown). The housing 2 is made of plastic and has a shoulder 3 which is directed radially outwards for support of a clutch release bearing according to the present invention, generally designated by reference, numeral 4 and configured in the form of a tapered roller bearing.

The clutch release bearing 4 includes a torsionally rigid outer bearing ring 5 which has an inwardly directed annular skirt 6 fixedly supported against the shoulder 3 of the housing 2 via an interposed clip 7. The skirt 6 of the bearing ring 5 is hereby forced against the shoulder 3 by a diaphragm spring 8 which is disposed between a collar 9 of the clip 7 and the skirt 6. The clutch release bearing 4 further includes a revolving inner bearing ring 10 which has a radial ring flange 11 having an outer side 12 for forced engagement of a spring element 13, such as spring finger ends of the separating clutch.

Guided between the bearing rings 5, 10 are a plurality of rolling elements 17, which are received in a cage 16. Seals are provided on both sides of the rolling elements 17 and include a first sealing arrangement 18 disposed on the side of the rolling elements 17 proximate to the ring flange 11 or separating clutch and fixedly secured to the outer bearing ring 5. The sealing arrangement 18 has a sealing lip 19 which is in sliding contact with a cylindrical portion of the inner bearing ring 10. A second sealing arrangement, generally designated by reference numeral 20a, is provided to realize a sealing of an annular gap 21 established on the side of the rolling elements 17, proximate to the shoulder 3 of the housing 2, between the bearing rings 5 and 10. The sealing arrangement 20a includes a ring element 22 which is, disposed in concentric surrounding relationship to the housing 2 and has one axial end abutting against the collar 9 of the clip 7. Providing on the other axial end of the ring element 22 is a sealing element 23 which surrounds the end of the housing 2, preferably in force-fitting manner, and includes two sealing lips 24, 25 extending in radial spaced-apart relationship toward a confronting planar surface 15 of the inner bearing ring 10. The radially inwardly arranged sealing lip 24 is configured to extend shy of the planar surface 15 so that a sealing gap 26 remains at a width "s". The radially outwardly arranged sealing lip 26 is constructed long enough for sliding contact upon the planar surface 15. As a consequence, the sealing element 23 defines two sealing zones, indicated by reference numerals 27, 28, whereby the sealing zone 27, formed by the inner sealing lip 24, provides an initial sealing effect to protect the roller support of the clutch release bearing 4 from ingress of coarse contaminants. Lubricant, e.g. adhesive grease, which has a high temperature stability and good adherence characteristics is introduced in the area between the sealing zones 27, 28 and on both sides of the sealing lip 24 of the sealing element 23. In this way, the sealing effect is enhanced and friction is reduced, while the service life of the sealing element 23 is improved.

Turning now to FIGS. 2 to 9, there are shown further embodiments of a clutch release bearing according to the present invention, with the difference between the embodiments residing in the construction of the second sealing arrangement. Parts corresponding with those in FIG. 1 are denoted by identical reference numerals and not explained again. The description below will center primarily on the differences between the embodiments, relating primarily to the construction of the second sealing arrangement.

Figure 2:
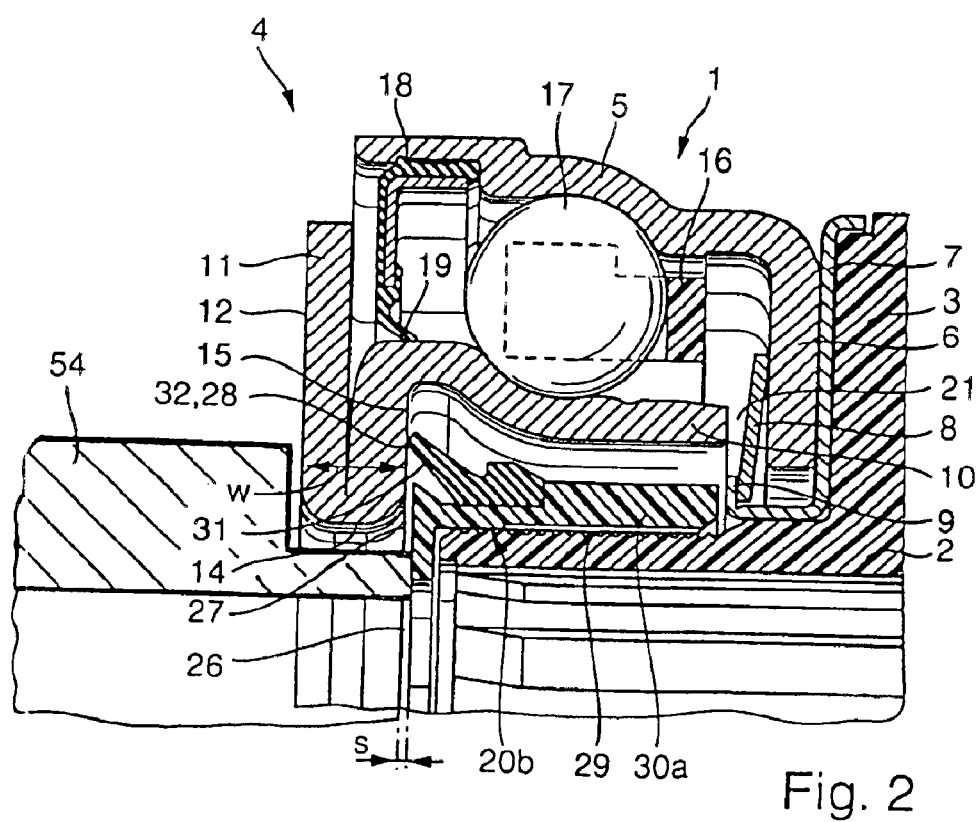
FIG. 2 is a half-section of a second embodiment of a clutch release bearing according to the present invention.

In FIG. 2, the clutch release bearing 4 includes a second sealing arrangement, generally designated by reference numeral 20b. The sealing arrangement 20b includes a support ring 30a which is formed with microscopic splines 29 for form-fitting engagement upon the housing 2 to thereby realize a sealing action. The support ring 30a is provided on an end portion proximate to the inner bearing ring 10 with a recess for receiving a sealing element 31 which surrounds the outer side of the support ring 30a. The sealing element 31 has a sealing lip 32 which defines the sealing zone 28 and is in sliding contact with the planar surface 15 of the revolving inner bearing ring 10. The support ring 30a demarcates in concert with the planar surface 15 the sealing gap 26 to thereby form the sealing zone 27. The sealing arrangement 20b is constructed in such a way that through appropriate selection of the tolerance between the support ring 30a and the diameter of the housing 2 and configuration of the microscopic splines 29 the sealing arrangement 20b automatically assumes a correct disposition, when the inner bearing ring 10 is installed. The defined sealing gap 26 is hereby automatically established and the sealing lip 32 of the sealing element 31 is automatically biased by a defined load. In order to reduce friction and wear, the planar surface 15 is coated with lubricant, e.g. adhesive grease, at least in the support zone of the sealing lip 32.

Assembly of the clutch release bearing 4 is as follows: First, the outer bearing ring 5 is securely fixed against the shoulder 3 of the housing 2 with the assistance of the clip 7 and the diaphragm spring 8. After insertion of the cage 16, including the rolling elements 17, the sealing arrangement 18 is placed axially in the bearing ring 5. Subsequently, the sealing arrangement 20b is pushed axially onto the housing 2, whereby the end position of the sealing arrangement 20b is governed by the installed position of the inner bearing ring 10. As the inner bearing ring 10 is installed by means of a press-fit tool 41, indicated by broken line, the support ring 30a rests against a flat surface of the press-fit tool 41 and is shifted hereby axially upon the housing 2 in the direction of the shoulder 3. The press-fit tool 54 has a central projection at a length measure which exceeds a wall thickness "w" of the bearing ring 10 in a shoulder area 14 of the bearing ring 10 by the dimension "s" of the sealing gap 26 to establish the defined sealing gap 26 between the planar surface 15 and the support ring 30a. In other words, the support ring 30a is placed at an axial offset to the planar surface 15.

Figure 3:
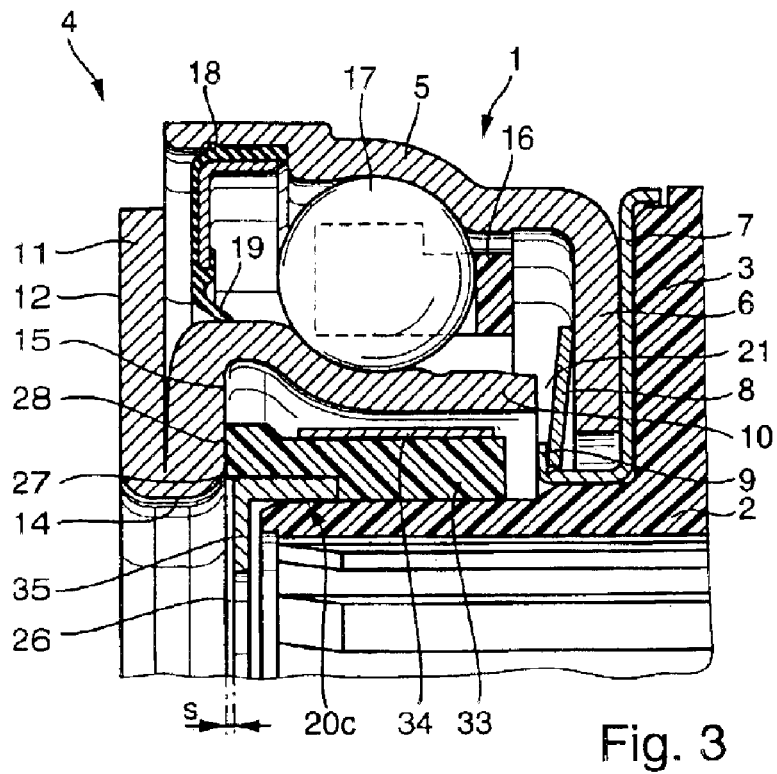
FIG. 3 is a half-section of a third embodiment of a clutch release bearing according to the present invention.

FIG. 3 shows a second sealing arrangement, generally designated by reference numeral 20c and having a ring element 33 in surrounding relationship to the housing 2 and a tension band 34 for securely fixing the ring element 33 in place. The ring element 33 may be made of felt or fleece and rests with one end against the planar surface 15 of the revolving inner bearing ring 10. After a break-in phase, the support force or contact force decreases as a result of, e.g., a slight compaction of the material, in order to prevent a detrimental sliding contact of the ring element 33 across a large area of the planar surface 15. The ring element 33 may be dimensioned so as to establish at least a slight sealing gap 26. The sealing gap 26 of the sealing zone 27 can be realized by providing the ring element 33 on the inside with a cylindrical reinforcement 35 which is directly guided upon the housing 2. The reinforcement 35 has one end formed with an inwardly directed collar for support of the press-fit tool 54 (FIG. 2), when the bearing ring 10 is installed. The sealing gap 26 is maintained by providing an axial overmeasure between the ring element 33 and the reinforcement 35 on the side facing the planar surface 15.

Figure 4:
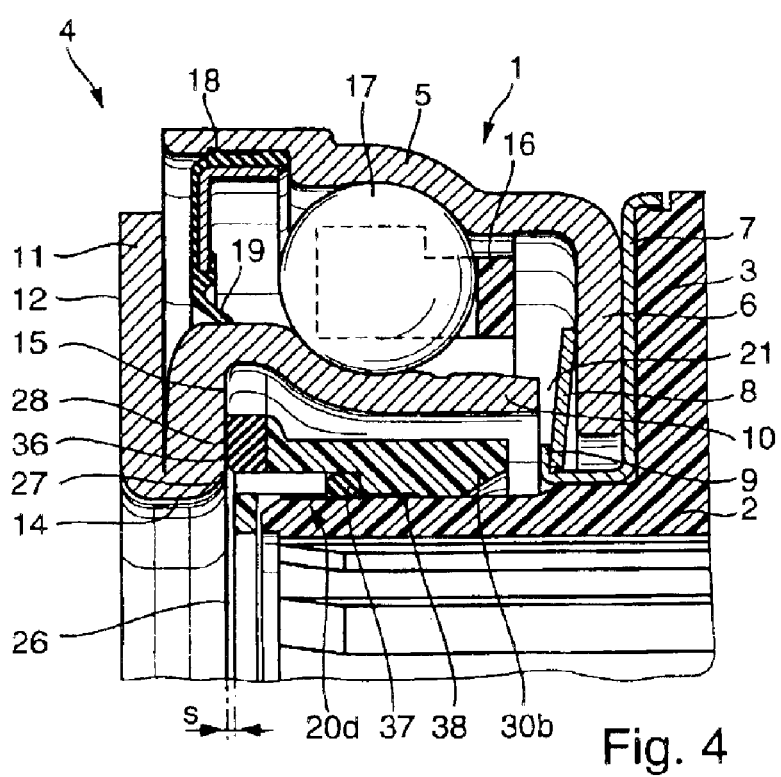
FIG. 4 is a half-section of a fourth embodiment of a clutch release bearing according to the present invention.

FIG. 4 shows a second sealing arrangement, generally designated by reference numeral 20d and having a support ring 30b which extends with one end, similar as the support ring 30a of FIG. 2, to an area near the planar surface 15 of the bearing ring 10 so as to define the sealing gap 26. A sealing element 36 is received by the support ring 30b in radial surrounding relationship to the sealing gap 26 and defines the sealing zone 38. The sealing element 36 can be in sliding contact with the planar surface 15 or distanced from the planar surface 15 by a slight sealing gap. In the area of the sealing zone 28, the planar surface 15 is coated with adhesive grease to enhance the sealing effect and to reduce the friction between the sealing element 36 and the bearing ring 10. The support ring 30b is further provided with a sealing ring 37 for sealing an annular gap 38 defined in radial direction by the support ring 30b and the housing 2.

Figure 5:
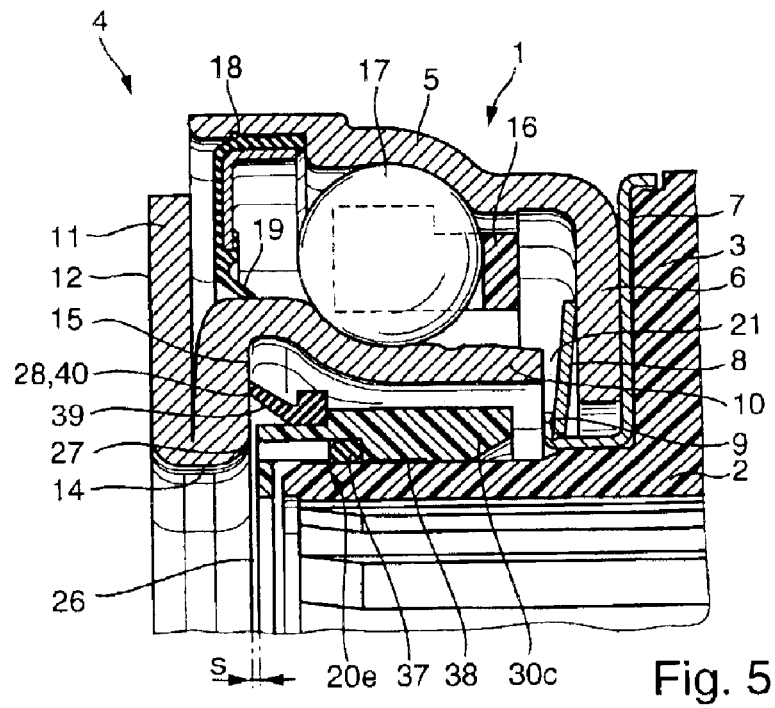
FIG. 5 is a half-section of a fifth embodiment of a clutch release bearing according to the present invention.

FIG. 5 shows a modified second sealing arrangement, generally designated by reference numeral 20e. Hereby, the support ring 30c is also provided with sealing ring 37 for sealing the annular gap 38 and bounds together with the planar surface 15 the sealing gap 26 in axial direction to define the sealing zone 27. The difference to the embodiment of FIG. 4 resides in the provision of an elastic sealing element 39 having a sealing lip 40 which rests against the planar surface 15 for formation of the sealing zone 28.

Figure 6:
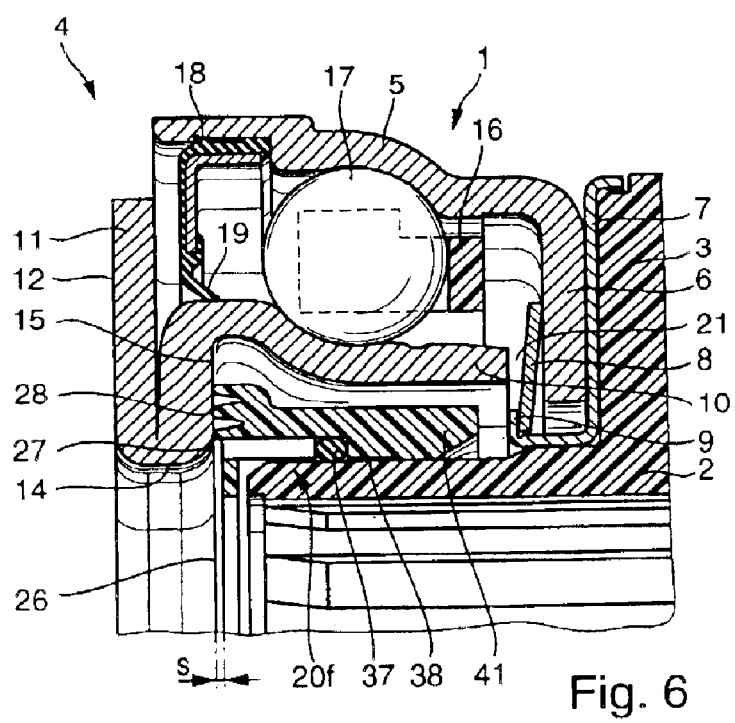
FIG. 6 is a half-section of a sixth embodiment of a clutch release bearing according to the present invention.

FIG. 6 shows a second sealing arrangement, generally designated by reference numeral 20f and including a sealing sleeve 41 which is disposed in surrounding relationship to one end of the housing 2 and is made in the form of a formed plastic part. The sealing gap 38 formed between the sealing sleeve 41 and the housing 2 is sealed by a sealing ring 37 which is placed in the sealing sleeve 41. On the side opposite to the planar surface 15, the sealing sleeve 41 forms a labyrinth seal, i.e. three sealing lips stepped in radial direction and conically tapering in the direction toward the free end, for defining together the sealing zone 28. Located radially inwardly of the sealing zone 28, the sealing sleeve 41 has an axially offset contour to axially bound the sealing gap 26 together with the planar surface 15 and thus the sealing zone 27. The sealing action can be optimized and friction can be reduced by coating the planar surface 15 with adhesive grease in the area of contact of the sealing lips.

Figure 7:
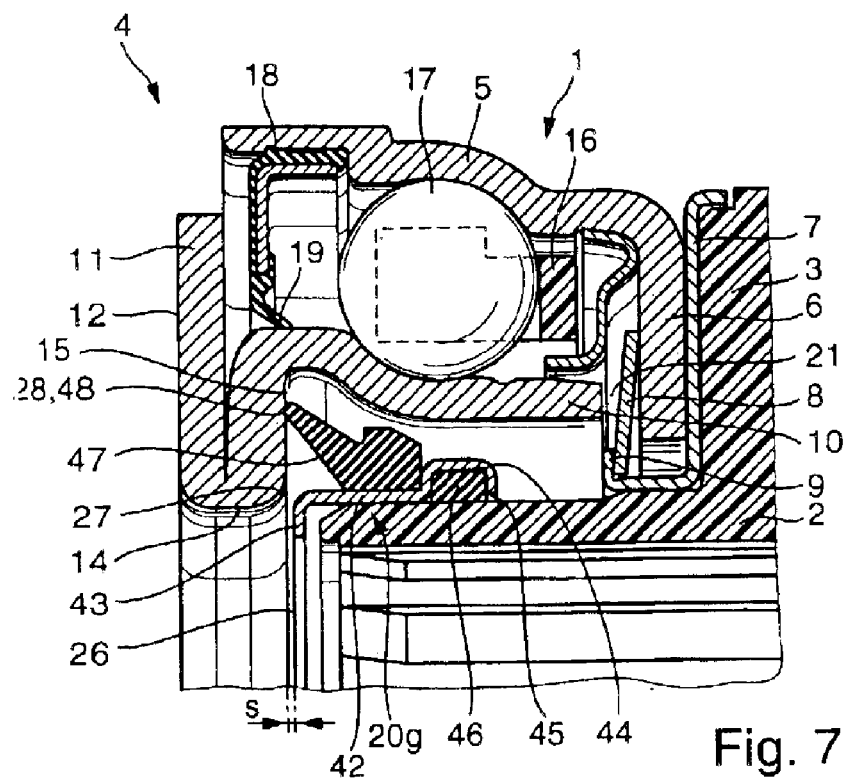
FIG. 7 is a half-section of a seventh embodiment of a clutch release bearing according to the present invention.

FIG. 7 shows a second sealing arrangement, generally designated by reference numeral 20g and including three components. A retention sheet 42 is disposed in surrounding relationship to the one end of the housing, suitably in force-fitting engagement, and has on one end a radially inwardly directed collar 43 which together with the planar surface 15 of the revolving inner bearing ring 10 demarcates the sealing gap 26 in axial direction and thus the sealing zone 27. On the side distal to the collar 43, the retention sheet 42 is radially outwardly recessed at 44 to form a radially inwardly open annular groove 45 for receiving a sealing ring 46 to seal the annular gap 38 between the retention sheet 42 and the housing 2. A sealing element 47 is placed anteriorly of the recessed portion 44 and extends in the direction of the planar surface 15 with a sealing lip 48 for sliding contact upon the planar surface 15 and formation of the sealing zone 28. The recessed portion 44 forms hereby a stop for disposition of the sealing element 47.

Figure 8:
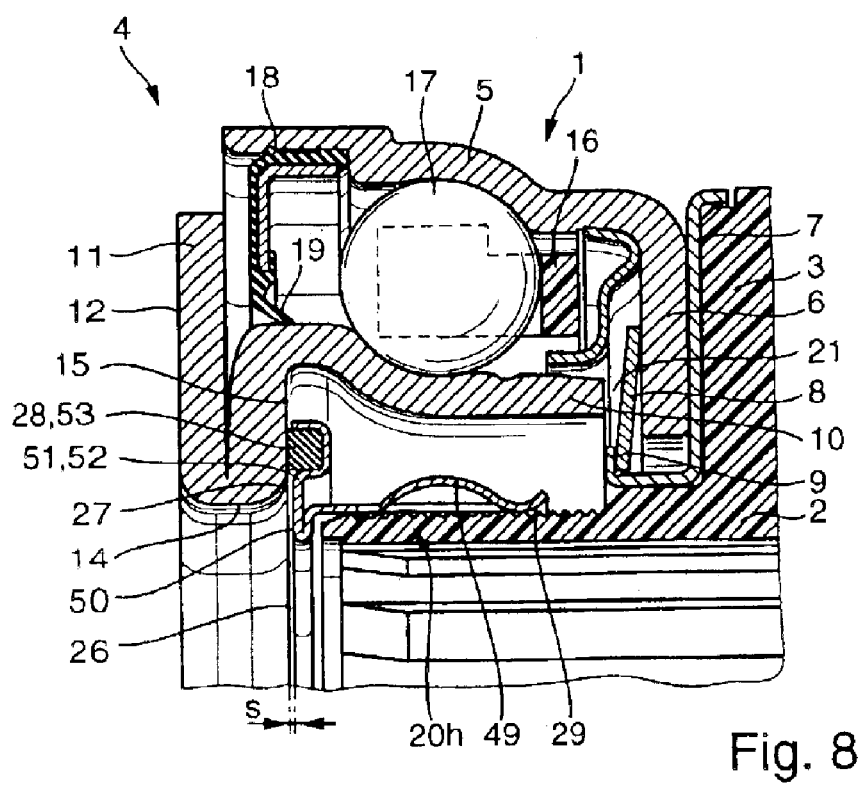
FIG. 8 is a half-section of an eighth embodiment of a clutch release bearing according to the present invention.

FIG. 8 shows a second sealing arrangement, generally designated by reference numeral 20h and including also a retention sheet 49 which is snapped in form-fitting manner to the housing 2 via microscopic splines 29 and has a vertical radial portion 50 having one end which is axially recessed at 51 to thereby define an annular groove 52 which is open in the direction of the planar surface 15 for receiving a sealing ring 53 and formation of the sealing zone 28. The vertical portion 50 of the retention sheet 49 extends from the recessed area 51 in axial offset relationship to the planar surface 15 of the bearing ring 10 for creating the sealing gap 26 and thus the sealing zone 27.

Figure 9:
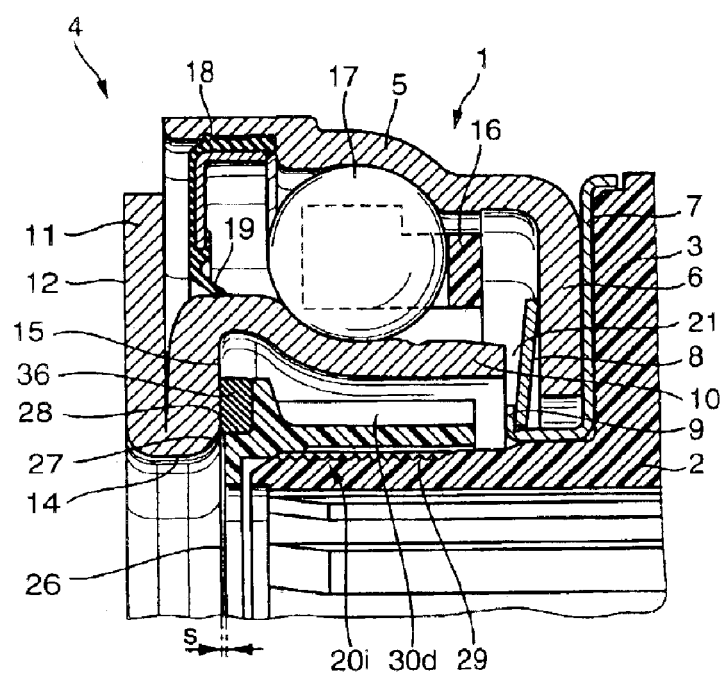
FIG. 9 is a half-section of a ninth embodiment of a clutch release bearing according to the present invention.

FIG. 9 shows a second sealing arrangement, generally designated by reference numeral 20i and substantially corresponding to the sealing arrangement 20b, shown in FIG. 2. The sealing arrangement 20i includes a support ring 30d which is connected to the housing 2 via microscopic splines 29. An axial offset of the support ring 30d in relation to the planar surface 15 defines the sealing gap 26. The sealing zone 28 is formed in this embodiment by providing the sealing arrangement 20i with a felt ring or fleece ring 36 which is received on one end of the support ring 30d and sealingly rests against the planar surface 15 of the inner bearing ring 10 substantially free of friction, once the break-in phase of the clutch release bearing 4 is over.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A clutch release bearing in the form of a tapered rolling bearing of a clutch operator for release of a separating clutch disposed between an internal combustion engine and a gearbox, said clutch release bearing comprising:
a housing;
a first bearing ring having a skirt for fixed rotative securement of the first bearing ring to the housing;
a revolving second bearing ring connected to the separating clutch via a spring element;
a plurality of rolling elements guided between the first and second bearing rings; and sealing means provided on both sides of the rolling elements at a distance thereto, said sealing means including a sealing arrangement securely fixed to the housing and comprised of at least two components to establish two sealing zones for sealing an annular gap between the first and second bearing rings, wherein the sealing arrangement cooperates with a planar surface of the second bearing ring and assumes a desired position, when the second bearing ring is installed by means of a press-fit tool,
wherein a sealing gap between the sealing arrangement and the planar surface of the second bearing ring is self-adjusting, when the clutch release bearing is assembled.

2. The clutch release bearing of claim 1, wherein the sealing arrangement includes a ring element mounted, at least in one of form-fitting engagement and force-fitting engagement, to the housing and placed in surrounding relationship to an end of the housing, and a sealing element connected to the ring element and sealingly bearing upon the planar surface of the second bearing ring, wherein the sealing element is constructed to define the sealing zones.

3. The clutch release bearing of claim 1, wherein the ring element is configured to define an installation position of the sealing element.

4. The clutch release bearing of claim 2, wherein the sealing element has a radially inwardly disposed first sealing lip and a radially outwardly disposed second sealing lip, wherein the first sealing lip extends towards the planar surface while maintaining a sealing gap therebetween, and the second sealing lip rests against the planar surface.

5. The clutch release bearing of claim 1, wherein the sealing arrangement includes a ring element mounted, at least in one of form-fitting engagement and force-fitting engagement, to the housing and placed in surrounding relationship to an end of the housing, and a sealing element connected to the ring element and sealingly resting against the planar surface of the second bearing ring, wherein both the sealing element and the ring element are configured to define the sealing zones.

6. The clutch release bearing of claim 5, wherein the ring element is a support ring which extends toward the planar surface to axially demarcate a sealing gap therebetween, wherein the sealing element is disposed in surrounding relationship to an end of the support ring and has a sealing lip resting against the planar surface.

7. The clutch release bearing of claim 1, wherein the sealing arrangement includes a ring element, a reinforcement extending at an axial offset to the planar surface of the second bearing ring and having an end surface interacting with the planar surface, and a tension band for securely mounting the ring element to the housing.

8. The clutch release bearing of claim 7, wherein the ring element is made of felt material or fleece material.

9. The clutch release bearing of claim 1, wherein the sealing arrangement includes a support ring secured to the housing and extending toward the planar surface of the second bearing ring to demarcate a sealing gap therebetween for defining one of the sealing zones, a sealing element disposed between an end surface of the support ring and the planar surface for defining the other sealing zone, and a sealing ring received in an annular gap between the support ring and the housing.

10. The clutch release bearing of claim 9, wherein the sealing ring is a felt ring or a lip seal.

11. The clutch release bearing of claim 1, wherein the sealing arrangement includes a sealing sleeve which defines with the housing an annular gap, and a sealing ring received in the annular gap between the sealing sleeve and the housing, wherein the sealing sleeve has end surface which demarcates the sealing gap for formation of one of the sealing zones and has a splined contour in radially spaced relationship to the sealing gap for defining the other sealing zone, said splined contour including at least two contact surfaces for interaction with the planar surface.

12. The clutch release bearing of claim 11, wherein the sealing zones of the sealing sleeve are configured as a labyrinth.

13. The clutch release bearing of claim 1, wherein the sealing arrangement includes a retention sheet having one end terminating in a collar turned radially inwards in axial relationship to the planar surface, and another opposite end which is outwardly recessed to form an annular groove which is open radially inwardly, a first sealing ring received in the annular groove, and a second sealing ring disposed in surrounding relationship to the retention sheet and including a sealing lip resting against the planar surface of the second bearing ring.

14. The clutch release bearing of claim 13, wherein the retention sheet is a deep-drawing part made by a process without material removal.

15. The clutch release bearing of claim 13, wherein the outwardly recessed area of the retention sheet provides an axial stop for disposition of the second sealing ring.

16. The clutch release bearing of claim 1, wherein the sealing arrangement includes a retention sheet which is snapped onto the housing and has a radial portion in axial offset relationship to the planar surface for defining the sealing gap and thereby one of the sealing zones, wherein the radial portion is recessed to form an annular groove which is open to the planar surface, and a sealing ring received in the annular groove for defining the other sealing zone.

17. The clutch release bearing of claim 16, wherein the sealing ring is an O-ring seal.

18. The clutch release bearing of claim 16, wherein the retention sheet is a deep-drawing part made by a process without material removal.

19. The clutch release bearing of claim 1, wherein the sealing arrangement includes a support ring directly mounted to the housing and axially defining with the second bearing ring the sealing gap in an area of the planar surface, and a sealing element received in a pocket of the support ring for interaction with the planar surface.

20. The clutch release bearing of claim 1, wherein the sealing arrangement is secured through forced engagement to the housing.

21. The clutch release bearing of claim 1, wherein the sealing arrangement is secured form-fittingly to the housing via microscopic splines.

22. The clutch release bearing of claim 1, wherein the sealing arrangement is permanently secured to the housing.

23. The clutch release bearing of claim 1, wherein the sealing arrangement is glued to the housing.

24. The clutch release bearing of claim 1, Wherein the sealing arrangement is made of plastic.

25. The clutch release bearing of claim 1, wherein the sealing arrangement is made of PA66GF.

26. The clutch release bearing of claim 1, wherein the sealing arrangement includes a sealing element in the form of a felt ring or fleece ring for interaction with the planar surface of the second bearing ring and defining one of the sealing zones.

27. The clutch release bearing of claim 1, wherein the planar surface of the second bearing ring is coated with adhesive grease in the area of the sealing zones.

28. A clutch release bearing, comprising:

a housing;

a first bearing ring securely fixed to the housing;

a second bearing ring having a planar surface and disposed at a radial distance to the first bearing ring to define a track for rolling elements; and sealing means for preventing ingress of foreign particles, said sealing means including a sealing arrangement for sealing a gap between the first and second bearing rings at an axial distance to the planar surface, said sealing arrangement being constructed to define two sealing zones in radial spaced-apart relationship for interaction with the planar surface, wherein one of the sealing zones is in contact with the planar surface and the other one of the sealing zones is spaced from the planar surface at formation of an annular gap therebetween.

29. The clutch release bearing of claim 28, wherein the one of the sealing zones is in sliding contact with the planar surface.

30. The clutch release bearing of claim 28, wherein the radial spaced-apart sealing zone define a space for receiving lubricant.

* * * * *